United States Patent [19]
Eriksson

[11] 3,990,402
[45] Nov. 9, 1976

[54] DEVICE IN APPARATUSES FOR FEEDING ANIMALS

[76] Inventor: Lars Henrik Eriksson, Baldersvagen 2A, S-951 00 Lulea, Sweden

[22] Filed: June 30, 1975

[21] Appl. No.: 591,432

[30] Foreign Application Priority Data
July 12, 1974 Sweden .................................. 7409163

[52] U.S. Cl. ............................. 119/56 R; 222/517
[51] Int. Cl.² ........................................... A01K 5/00
[58] Field of Search .......... 119/56 R, 52 AF, 51.11; 222/517

[56] References Cited
UNITED STATES PATENTS

| | | | |
|---|---|---|---|
| 3,180,318 | 4/1965 | Fisher | 119/51.11 X |
| 3,234,910 | 2/1966 | Moloney | 119/56 R |
| 3,504,654 | 4/1970 | Geerlings et al. | 119/56 R |
| 3,587,530 | 6/1971 | Blair | 119/51.11 |

Primary Examiner—Hugh R. Chamblee
Attorney, Agent, or Firm—Zarley, McKee, Thomte & Voorhees

[57] ABSTRACT

The present invention is related to a device in animal feeding apparatuses comprising dosage containers having foldable bascules or scuttles, which are adjustable and fixable at different heights in the containers for the purpose of changing the volume of the containers, wherein an operating means striving always to hold the scuttle in a closing position is associated to and actuatable by a loop of a cord or band member or the like extending within the container, one end of said band member being applied to an attachment situated at or near the lower part of the container and the other end thereof being connected to a release mechanism, which may be common to a plurality of dosage containers, whereby a pulling force transmitted from the release mechanism to the band member causes independently of the height adjustment of the scuttle, a decrease of the size of the loop, which in turn causes the operating means to be moved away and the scuttle to be opened.

9 Claims, 3 Drawing Figures

DEVICE IN APPARATUSES FOR FEEDING ANIMALS

The present invention relates to a device in apparatuses for feeding animals of the kind comprising fodder dosage containers having foldable bascules or scuttles, which are adjustable and fixable at different heights in the containers for the purpose of changing the volume of the containers. Such a device is previously known by the Swedish Patent Specification No. 350 385. Although this known device is extremely efficient as to the possibilities of varying the dosage of fodder, the same has disadvantages regarding the equipment for the opening and closing respectively of the scuttle. In the known device there is inter alia the risk that the animals themselves contrary to the wish of the farmer, might open the scuttle and thereby cause considerable problems in the dosage technique. Further, the equipment in question is comparatively complicated and expensive.

The present invention is aiming at eliminating the above related disadvantages and provide an efficient, inexpensive and reliable feeding plant for animal food or fodder.

What primarily characterizes the device according to the invention is that an operating means, striving always to hold the scuttle in a closed position, is associated to and actuatable by a loop of a cord or band member or the like extending within the container, one end of said band member being applied to an attachment situated at or near the lower part of the container, and the opposite end thereof being connected to a release mechanism common to a plurality of dosage containers, whereby a pulling force transmitted from the release mechanism to the band member causes, independently of the height adjustment of the scuttle, a decrease of the size of the loop, which in turn moves away the operating means and opens the scuttle.

In a preferred embodiment of the invention, the operating means comprises one or more springs striving automatically to move the scuttle to a closed position and to interlock the same, the said loop bending or moving the springs aside or away.

With reference to appended drawings, below follows a more detailed description of an embodiment of the invention, chosen as an example.

Figure 1:
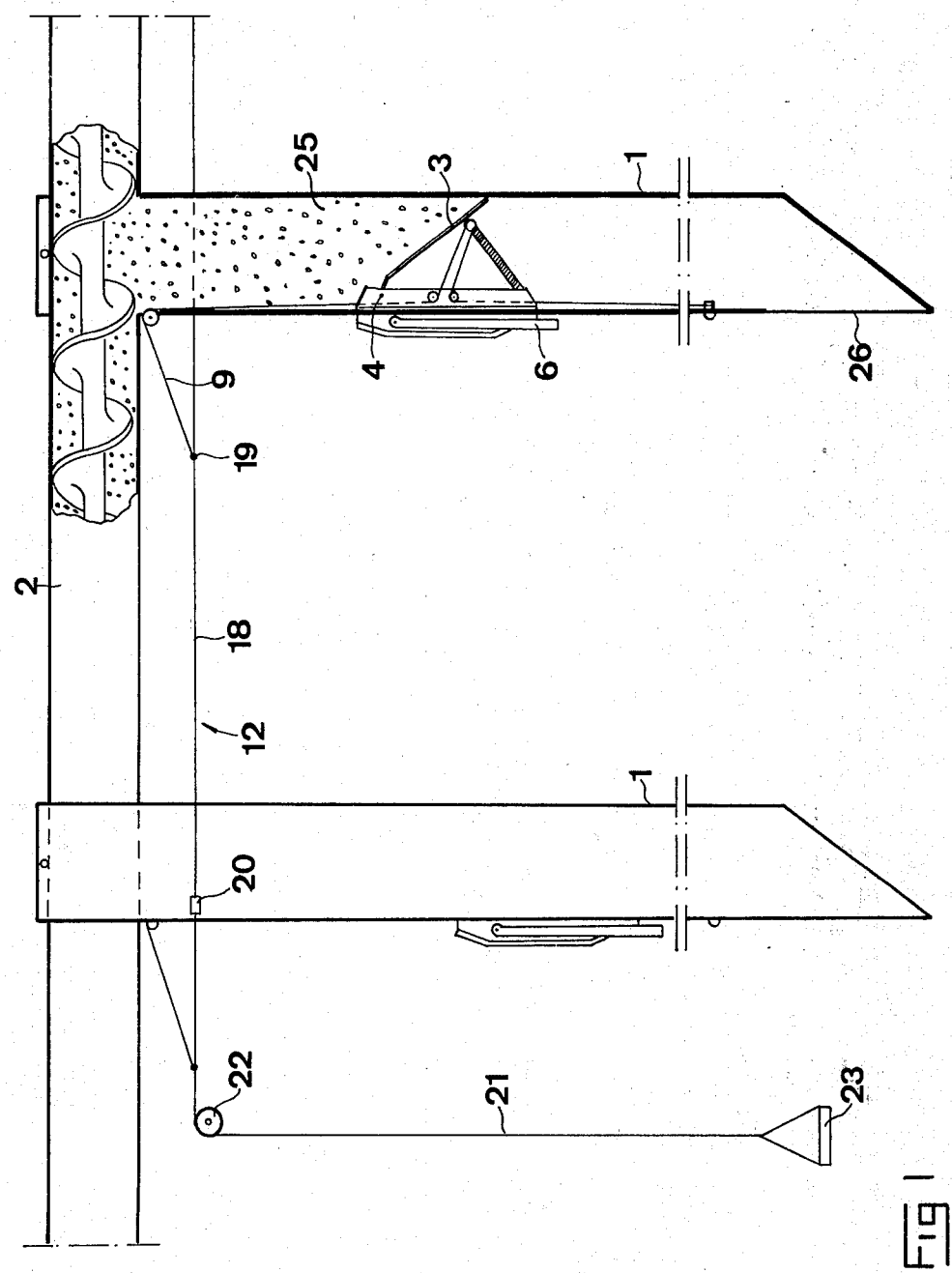
FIG. 1 is a partly cut side view of an animal feeding plant comprising a plurality of dosage containers, two of which being shown in the drawings.
Figure 3:
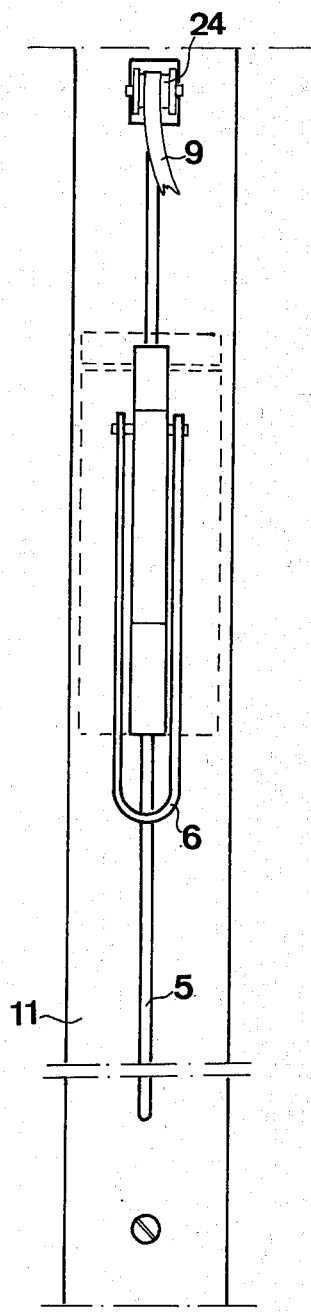
FIG. 3 is a side view of the container seen from the left in FIG. 2.

The apparatus or plant shown in FIG. 1 comprises in a way known per se a plurality of dosage containers 1 connected to a conveyor 2, in this case a worm conveyor, which from a central storage supplies feeding-stuff or fodder, to each of the containers. For closing or limiting each individual container, a bascule or scuttle 3 is arranged therein and adjustable and fixable at different heights in the container to vary the volume of the feeding-stuff receiving container part. In the embodiment shown, the scuttle 3 is arranged pivotably in a bracket 4, which in a way known by the Swedish Patent Specification No. 350 385 is slidable vertically along a slot 5 in one of the walls of the container (see FIG. 3) and fixable in selectable height positions by means of an eccentric clamping member 6.

Figure 2:
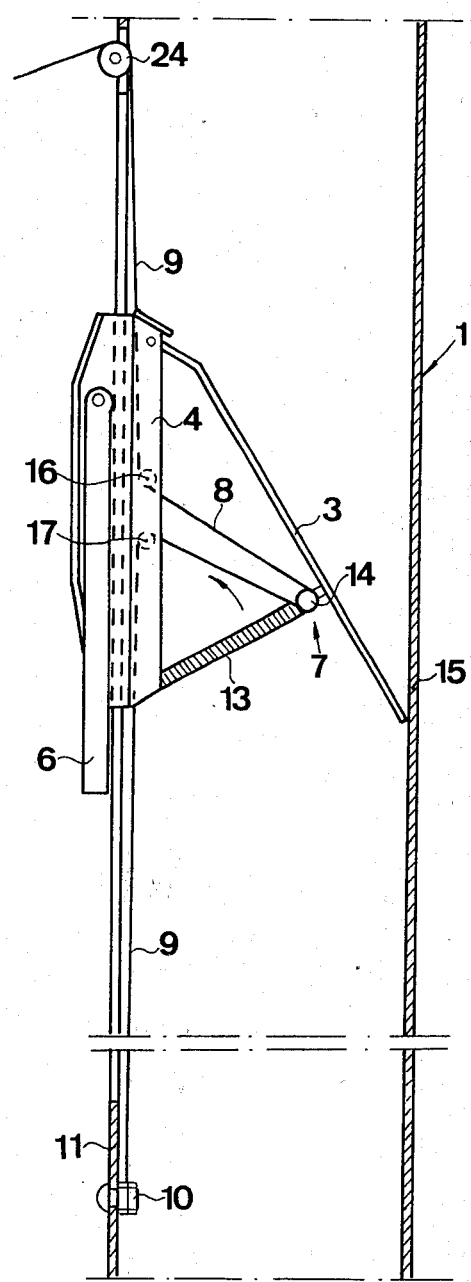
FIG. 2 is an enlarged cross sectional view through a dosage container representing the characteristics of the invention.

Reference is now made to FIG. 2 illustrating how an operating means, generally designated by 7 always strives to hold the scuttle in a closing position and is associated to and actuatable by a loop 8 of a band member or the like 9 extending within the container 1. One end of this band member 9 is applied to an attachment 10 situated at or near the lower part of the container, in this case below the slot 5 in the wall 11 of the container (see FIG. 3). The opposite end of the band member 9 is connected to a release mechanism designated by 12 in FIG. 1 and common to all of the dosage containers in the plant. According to the invention, a pulling force transmitted from the release mechanism 12 to the band member 9 provides independently of the height adjustment of the scuttle 3, a decrease of the size of the loop 8, which in turn causes the operating means 7 to be moved away and the scuttle 3 to be opened.

When band members are mentioned in connection with the invention, this expression should be interpreted in a very wide sense. Instead of a member having a flat cross section, it is thus possible to use many other types of flexible, like members, such as for instance ropes, wires, cords, cables, chains and so on.

According to a preferred embodiment of the invention, the operating means 7 comprises one or more springs 13 striving, self-acting, to hold the scuttle 3 closed. In the example shown, two parallel working springs in the form of bending springs are provided, the root portions of which are attached to the lower part of the bracket 4 and the opposite portions or ends of which are connected to a body 14 (in this case cylindric) extending across the longitudinal direction of the springs 13 and joining the two springs. In the body 14 there is suitably recessed a groove situated between the two springs 13, said groove guiding the band member formed into a loop. Instead of a groove in the body, a pulley roll may be placed to receive the band member. The body 14 is abutting against the underside of the scuttle 3, while the springs 13 strive to hold the scuttle 3 in a closed position. The weight of the feeding-stuff above the closed scuttle 3 acts upon the springs 13 only in their longitudinal direction. The strength of the springs, therefore need only be adapted to the power required to close the scuttle 3, when the dosage container is empty. The loop 8 of the band member is formed by means of two pulley rolls 16 and 17 arranged on the bracket 4 as close to the side wall 11 as possible. In this case, the pair of pulley rolls 16, 17 is arranged at a certain level above the springs 13 so that the springs with decreasing size of the loop 8, will be bent upwards towards the pulley rolls in direction of the arrow in FIG. 2.

The previously mentioned release mechanism 12 comprises a longish element 18 extending past all of the dosage containers 1 included in the plant, the band member 9 of each container being connected with one end to said element. The connection points are designated by 19 in FIG. 1. Preferably the element 18 consists of a longish rod journalled in sliding bearings 20 on each of the containers 1, although it is conceivable to use other elements, such as ropes, cords, cables, chains or the like. The element 18 is in this case connected to or comprises a cord part or the like 21 via a pulley roll 22. The cord may be provided with a handle 23. When a large number of dosage containers are connected to the same release mechanism, a lever may assist in attaining the necessary pulling force.

The band members are running from their connection points 19 down into the containers via pulley rolls 24. The band members may serve as internal sealings for the slots 5.

The device described operates in the following way. When all containers have been filled with feeding-stuff 25 by means of the conveyor 2 as illustrated in FIG. 1, all dosage containers may be opened simply by moving the handle 23. When the handle 23 is pulled downwards, the pulling force is transmitted via the cord part 21 and the element 18 to each of the band members 9; which in each individual container means that the loop 8 is decreased since the pulling force acts with the attachment 10 as an abutment, the springs 13 of the operating means 7 being bended upwards in the direction of the arrow in FIG. 2. This causes the scuttle 3 to be pivoted in clockwise direction due to its own weight and the weight of the feeding-stuff present above the scuttle. The scuttle is opened and the feeding-stuff is falling down through the container and out through the aperture 26 in the lower part of the container.

When the height adjustment of the scuttle 3 is changed in order to alter the dosage of feeding-stuff (which in a manner known per se is performed by loosening the clamping member 6, displacing the bracket 4 and once again clamping the clamping member), this has no effect on the function of the operating means 7, since a displacement of the scuttle only means that the body 14 and the pulley rolls 16 and 17 are moving along the band member. The form and dimension of the loop 8 is thus not changed by the changed height adjustment of the scuttle and the releasing or opening of the scuttle happens in the same way independently of said height adjustment.

The advantages of the invention are obvious since the device for opening the scuttle is inexpensive and efficient and independent of the height adjustment of the scuttle, and the animals cannot in any way release the scuttle since the band member according to the invention is arranged within the container 1.

The invention is obviously not limited to the embodiment described and shown in the drawings. The form and dimension of the containers 1 may thus vary considerably, although the longish, in cross section rectangular form is preferred. Further, if deemed preferable, other means for displacing vertically the scuttle 3 may be used than just a bracket 4 movable in a slot.

Other types of conveyors may be used instead of the worm conveyor. Also other modifications of the invention are conceivable within the scope of the claims.

What I claim is:

1. An animal feeding apparatus comprising,
    a plurality of upright containers each having a hinged scuttle for opening a food storage space above said scuttle upon pivoting said scuttle downwardly,
    each of said scuttles being movable between and fixable at different levels within said container for variably changing the volume of said food storage space,
    an operating means yieldably maintaining said scuttle in a closed position, said operating means being operatively connected to a loop of a cord means extending within said container,
    one end of said cord means being operatively secured to an attachment positioned adjacent the lower part of said container and the other end thereof being connected to a release mechanism, a pulling force transmitted from said release mechanism to said cord means causing independently of the actual level of said scuttle a decrease of the size of said loop which in turn causes said operating means to move away from said scuttle thereby permitting said scuttle to pivot downwardly to effectuate said opening of said food storage space.

2. The apparatus of claim 1 wherein said operating means comprises at least one spring yieldably urging said scuttle to said closed position and keep the same in said position.

3. The apparatus of claim 2, wherein said spring is a bending spring.

4. The apparatus of claim 2, wherein two springs are connected to a body thrusting against the underside of said scuttle and having a groove for said cord means.

5. The apparatus of claim 1, wherein said loop of said cord means is defined by two pulley rolls or members arranged on a bracket for said scuttle adjacent to a side wall of said container.

6. The apparatus of claim 5, wherein said two pulley rolls are arranged at a level above said springs in order to bend said springs towards said pulley rolls in opening said scuttle.

7. The apparatus of claim 1, wherein said release mechanism comprises an elongated element extending past a plurality of dosage containers, said cord means of each container being with one of its ends connected to said element.

8. The apparatus of claim 7, wherein said cord means extends from its connecting point on said element via a pulley roll down into said container.

9. The apparatus of claim 7, wherein said element is movable to and fro in bearings arranged on each of said containers.

* * * * *